UNITED STATES PATENT OFFICE.

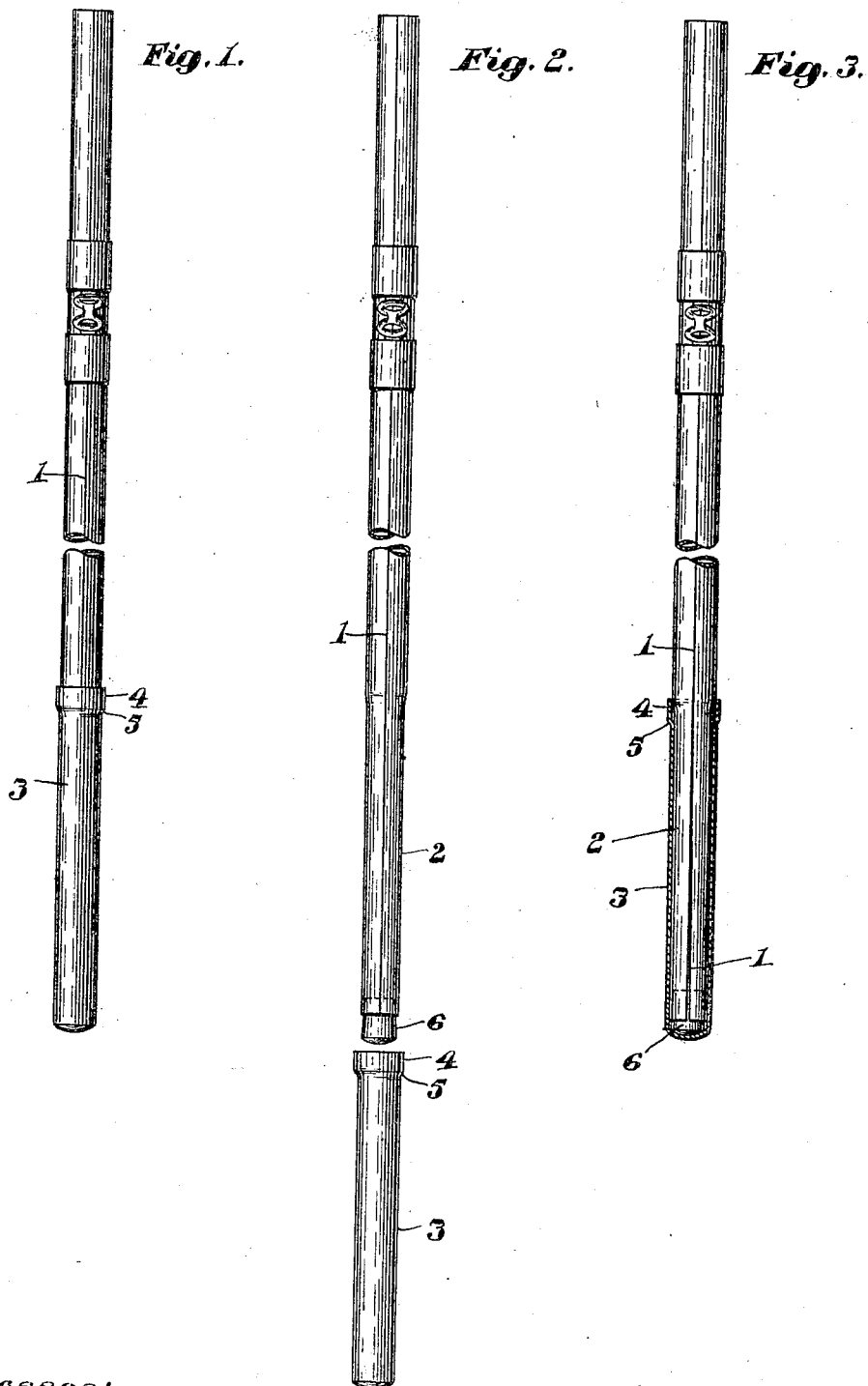

CHARLES A. TREDWELL, OF BRISTOL, CONNECTICUT, ASSIGNOR TO THE HORTON MANUFACTURING COMPANY, OF BRISTOL, CONNECTICUT, A CORPORATION OF CONNECTICUT.

FERRULE FOR FISH-RODS.

No. 837,157.     Specification of Letters Patent.     Patented Nov. 27, 1906.

Application filed April 5, 1905. Serial No. 254,000.

*To all whom it may concern:*

Be it known that I, CHARLES A. TREDWELL, a citizen of the United States, residing at Bristol, in the county of Hartford and State of Connecticut, have invented certain new and useful Improvements in Ferrules for Fish-Rods; and I do hereby declare the following to be a full, clear, and exact description of the invention, such as will enable others skilled in the art to which it appertains to make and use the same.

The present invention relates to a joint or section of tubular metallic fish-rods.

In fastening the ferrules to the ends of the joints or sections of metallic fish-rods it has been the practice to place the ferrule in position and then bore a hole diametrically through the ferrule and the end of the joint or section, then insert a rivet through the ferrule and the end of the joint or section, and thereafter dress off the ends of the rivet to produce the desired smooth and true cylindrical surface. This is quite an expensive proceeding, and much trouble has been caused by the loosening of the rivets.

The object of the invention is to produce a joint or section for a fish-rod made of tubular metal and to securely fasten the ferrule thereto without the use of rivets.

To the above ends the present invention consists of the improved joint or section for fish-rods, which will be hereinafter described and claimed.

The present invention is shown in the accompanying drawings, in which—

Figure 1 shows in elevation a portion of a joint or section of a jointed fish-rod with my improved ferrule secured thereto. Fig. 2 shows in elevation the end of a joint or section before the ferrule is secured and showing the expanding-plug inserted in the end preparatory to receiving the ferrule and the ferrule about to be put on. Fig. 3 shows a portion of the end of the joint or section with the ferrule securely fastened thereto, the ferrule being shown in longitudinal cross-section in order to illustrate the operation of the expanding-plug in holding the ferrule in place.

Similar reference characters will be employed throughout the specification and drawings to designate corresponding parts.

In the drawings the invention is shown as employed in the manufacture of metallic fish-rods in which the joints or sections are made of sheet-steel rolled into tubular form, the meeting edges being brought close together, forming a seam 1, running longitudinally from end to end of the sections or joints, but not fastened together.

The end 2 of the joint or section is reduced somewhat in diameter, as clearly shown, and upon this reduced end the ferrule 3 is secured.

The ferrule 3 is formed of brass or other suitable metal in the form of a long tube or cylinder closed at one end and preferably provided with an enlarged portion 4 at its open end and below such enlarged portion with a well-defined shoulder 5.

Before placing the ferrule 3 upon the end 2 of the joint or section there is inserted in the open end of the tubular joint or section an expanding-plug 6, formed of steel or other suitable metal and conical or tapering in shape, as shown, and which is of such a size relative to the inner diameter of the joint or section that when forced therein it will expand the end, all as will be readily understood from an inspection of the drawings.

In securing the ferrule 3 to the joint or section the expanding-plug is first inserted in the end 2 of the joint, but not forced therein. The ferrule 3 is then slipped over the end 2 until the end of the expanding-plug 6 engages the closed end of the ferrule 3, when further movement of the ferrule 3 will cause the expanding-plug 6 to be forced into the end of the joint or section to expand the lower split end in the ferrule 3, thus securely clamping the metal between the plug and the wall of the ferrule and fastening the ferrule in place in the end of the joint or section without the necessity of employing rivets or other fastening means.

The arrangement described is particularly adapted for use in rods made of sheet metal and having the seam or slit 1, which permits the end to expand as the tapered plug is forced into the end; but it could be adapted readily to tubular rods of other material by providing means, such as slitting, for permitting expansion of the end by the expanding-plug.

Having described my invention, I claim as new and desire to protect by Letters Patent of the United States—

A metallic section for fish-rods comprising a tube split longitudinally, a conical expanding-plug inserted in one end of the section, and a ferrule having a closed end fitted to said end of said section and engaging and forcing the conical plug into the section, the end of the section being clamped between the conical plug and the inner wall of the ferrule, substantially as described.

In testimony whereof I affix my signature in presence of two witnesses.

CHARLES A. TREDWELL.

Witnesses:
   Jos. D. Brown,
   Chas. T. Treadway.